(12) United States Patent
Li et al.

(10) Patent No.: US 11,772,479 B2
(45) Date of Patent: Oct. 3, 2023

(54) ELECTRIC WHEEL ASSEMBLY WITH INTEGRATED HUB MOTOR

(71) Applicant: Tsinghua University, Beijing (CN)

(72) Inventors: Jianqiu Li, Beijing (CN); Jiayi Hu, Beijing (CN); Bingkun Cai, Beijing (CN); Makeximu, Beijing (CN); Liangfei Xu, Beijing (CN); Hang Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 621 days.

(21) Appl. No.: 17/066,461

(22) Filed: Oct. 8, 2020

(65) Prior Publication Data

US 2021/0031615 A1    Feb. 4, 2021

Related U.S. Application Data

(63) Continuation of application No. PCT/CN2018/113483, filed on Nov. 1, 2018.

(30) Foreign Application Priority Data

Apr. 9, 2018    (CN) .......................... 201810310347.4
Apr. 9, 2018    (CN) .......................... 201820496964.3

(51) Int. Cl.
*B60K 7/00* (2006.01)
*B60K 17/12* (2006.01)
(Continued)

(52) U.S. Cl.
CPC .......... *B60K 7/0007* (2013.01); *B60K 17/046* (2013.01); *B60K 17/12* (2013.01);
(Continued)

(58) Field of Classification Search
CPC .... B60K 7/0007; B60K 17/046; B60K 17/12; B60K 2007/0038; B60K 2007/0092; B60L 7/10
See application file for complete search history.

(56) References Cited

U.S. PATENT DOCUMENTS 7,717,203 B2 * 5/2010 Yoshino ............... B60K 17/046
                                                         903/910
2016/0121709 A1 * 5/2016 Shin ........................ B60T 11/10
                                                         301/6.5

FOREIGN PATENT DOCUMENTS

CN    105270161 A  *  1/2016
CN    107458210 A  *  12/2017

* cited by examiner

*Primary Examiner* — John D Walters
(74) *Attorney, Agent, or Firm* — Hodgson Russ LLP

(57) ABSTRACT

An electric wheel assembly with an integrated hub motor includes a tire, a rim, a hub, a planetary reducer, an inner rotor motor, a braking system and a steering knuckle assembly. The inner rotor motor is provided in the rim, and its rotor is hollow and fitted over a motor rotor holder. An end of the motor rotor holder is mounted with a sun gear to transmit power to the planetary reducer, and the other end thereof is mounted with a brake disc. The planetary reducer employs a two-stage planet gear. The planetary reducer further includes a planet carrier integrated with the hub, serving as the reducer's power output end. The hub and the knuckle sleeve pass through the hollow motor rotor holder, and hub bearings are arranged thereamong. The inner rotor motor and the planetary reducer can employ an integrated direct oil cooling technology.

20 Claims, 3 Drawing Sheets

(51) Int. Cl.
 *B60L 7/10* (2006.01)
 *B60K 17/04* (2006.01)
(52) U.S. Cl.
 CPC ........ *B60L 7/10* (2013.01); *B60K 2007/0038* (2013.01); *B60K 2007/0092* (2013.01)

ELECTRIC WHEEL ASSEMBLY WITH INTEGRATED HUB MOTOR

CROSS-REFERENCE TO RELATED APPLICATION

The present application is a continuation of International Application No. PCT/CN2018/113483, filed Nov. 1, 2018, which claims priority to Chinese Patent Application No. 201810310347.4 and Chinese Patent Application No. 201820496964.3, each filed Apr. 9, 2018. The entire disclosures of the aforementioned applications are incorporated herein by reference.

FIELD

The present disclosure relates to a technical field of new energy vehicles, more particularly to an electric wheel assembly with integrated hub motor and reducer.

BACKGROUND

Conventional mechanically driven heavy-duty vehicles generally employ a centralized drivetrain, regardless of single-axle, double-axle, or multi-axle drive configuration, and often face some restrictions. Transmission shafts, transfer cases, differentials, and other components occupy most of the vehicle frame space, affecting the overall layout and the lightweight. The multi-stage drivetrain has low overall efficiency, thereby limiting the drive axles' increase and the development towards heavier loads. The reliability and fault-tolerant capability are also low because the drive wheels' power is provided by only one engine and complicated transmission components in series. The specific power is low, the dynamic property is restricted, and high-power engine technologies become the bottleneck of technological progress.

For electrified heavy-duty vehicles, the distributed-electric-drive configuration can be employed to avoid the above restrictions effectively. Remarkably, the electric wheel driven by hub motors can be employed so that the chassis' usable space can be greatly saved. The components other than the driving system can be easily and flexibly arranged. However, the electric wheel's design is complicated. How to reasonably arrange the motor, the reduction gearbox, the brake, and connect the suspension and steering system within the wheel's limited space become the research focus of various automobile companies and research institutes.

Currently, there are a variety of solutions for the electric wheels driven by the hub motors, generally including direct-hub-motor-drive and integrally driven by motor and reduction gearbox. In order to reduce the overall mass of the electric wheel and improve the driving torque requirements, the form of integrally driven by motor and reduction gearbox is usually required. The solution of multi-stage reduction will take up excessive space in the wheel and reduce the transmission efficiency, while the solution of a single-stage planetary reducer is often hard to achieve the required large reduction ratio. Secondarily, inappropriate arrangement of the motor and the reduction gearbox in the electric wheel will bring problems as follows: the position of the hub bearings of the wheel is unreasonably arranged; the hub motor takes up excessive space at the outer side of the wheel; there is no space for the arrangement of the steering, suspension and braking system; the motor housing or other components are loaded unreasonably, etc. If the braking system is unreasonably arranged, the electric wheel's reliability and safety will be affected, and the heat generated by the braking system will affect the performance of the motor. The design for an electric wheel also faces problems such as difficulty in cooling the motor, and too much unsprung mass.

SUMMARY

The present disclosure seeks to solve at least one of the problems existing in the related art. To this end, the present disclosure proposes an electric wheel assembly with an integrated hub motor, and various components of the electric wheel assembly have reasonable loading structures and light mass.

The electric wheel assembly with the integrated hub motor according to embodiments of the present disclosure includes: a rim adapted to mount a tire and having a spoke plate at an axial end of the rim; a hub connected to the spoke plate; a steering knuckle assembly including a knuckle sleeve, the knuckle sleeve being fitted over a shaft section of the hub, the knuckle sleeve and the hub being provided with a hub bearing therebetween; an inner rotor motor provided inside the rim and including: a motor housing including a motor rotor holder fitted over the outside of the knuckle sleeve, a rotor having a hollow structure, fitted over and secured on the motor rotor holder, and a stator fitted in and secured on the motor housing, the stator being fitted over the outside of the rotor; a planetary reducer including: a sun gear connected to an end of the motor rotor holder close to the spoke plate and being the input end of the planetary reducer, and a planet carrier integrated with the hub and being the output end of the planetary reducer; and a braking system including a brake disc, the brake disc being fitted over the motor rotor holder through a brake disc connection sleeve and located at the end of the motor rotor holder away from the spoke plate, and the braking system being configured to brake the electric wheel assembly by braking the motor rotor holder.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
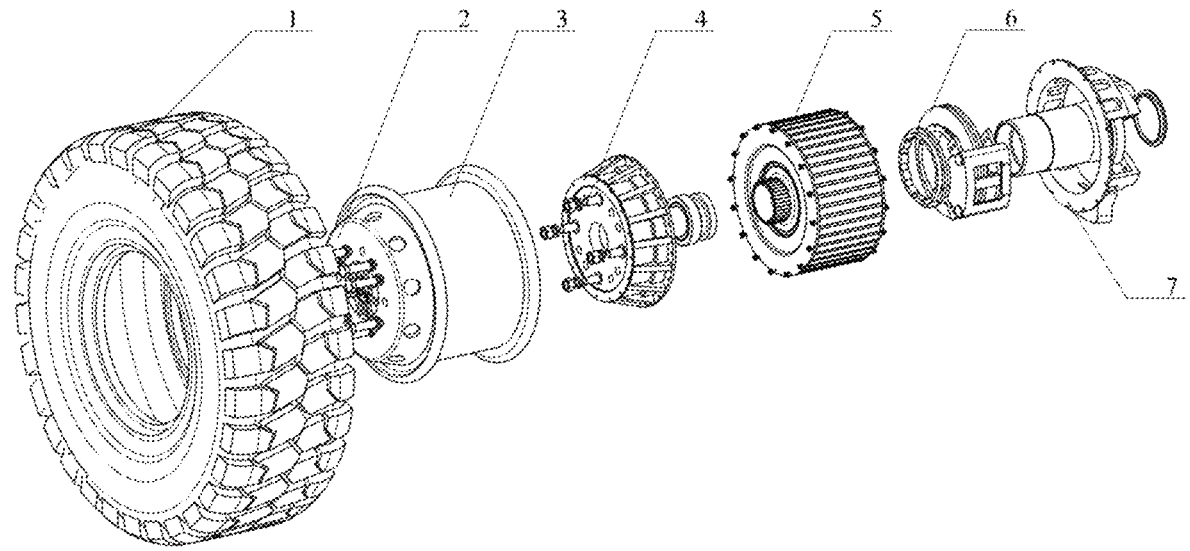
FIG. 1 is an exploded schematic view of an electric wheel assembly with an integrated hub motor according to an embodiment of the present disclosure.

REFERENCE NUMERALS electric wheel assembly 100; tire 1; spoke plate 2; rim 3; planetary reducer 4; inner rotor motor 5; braking system 6; steering knuckle assembly 7; reducer oil seal 8; gear ring carrier 9; gear ring 10; planet gear pin 11; planet gear bearing 12; planet gear 13; auxiliary planet carrier 14; sun gear 15; hub 16; knuckle sleeve 17; steering knuckle housing 18; suspension spherical hinge 19; brake disc connection sleeve 20; brake disc 21; knuckle 22; brake caliper 23; hub bearing 24; sealing end cap 25; round nut 26; motor oil seal 27; motor oil seal retaining ring 28; resolver 29; motor inner end cap 30; motor stator housing 31; winding 32; stator 33; rotor 34; knuckle oil seal 35; motor rotor holder 36; motor outer end cap 37; gear ring end cap 38; motor bearing 39; oil slinger 40; motor housing 41; toque transferring pin 42.

DETAILED DESCRIPTION

Embodiments of the present disclosure will be described in detail and examples of the embodiments will be illustrated in the figures, where same or similar reference numerals are used to indicate same or similar components or components with same or similar functions. The embodiments described herein with reference to figures are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the figures under discussion. These relative terms are for convenience of description and do not require that the present disclosure be constructed or operated in a particular orientation. In addition, the feature defined with "first" and "second" may comprise one or more of this feature. In the description of the present disclosure, the term "a plurality of" means two or more than two, unless specified otherwise.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

An electric wheel assembly 100 with an integrated hub motor according to embodiments of the present disclosure will be described in the following with reference to FIGS. 1 to 7.

Figure 2:
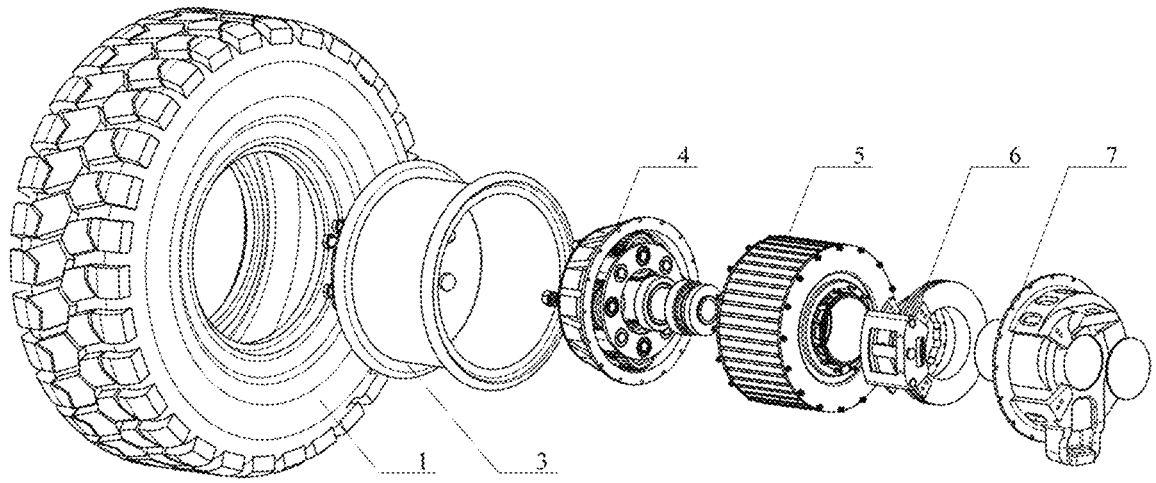
FIG. 2 is another exploded schematic view of an electric wheel assembly with an integrated hub motor according to an embodiment of the present disclosure.
Figure 3:
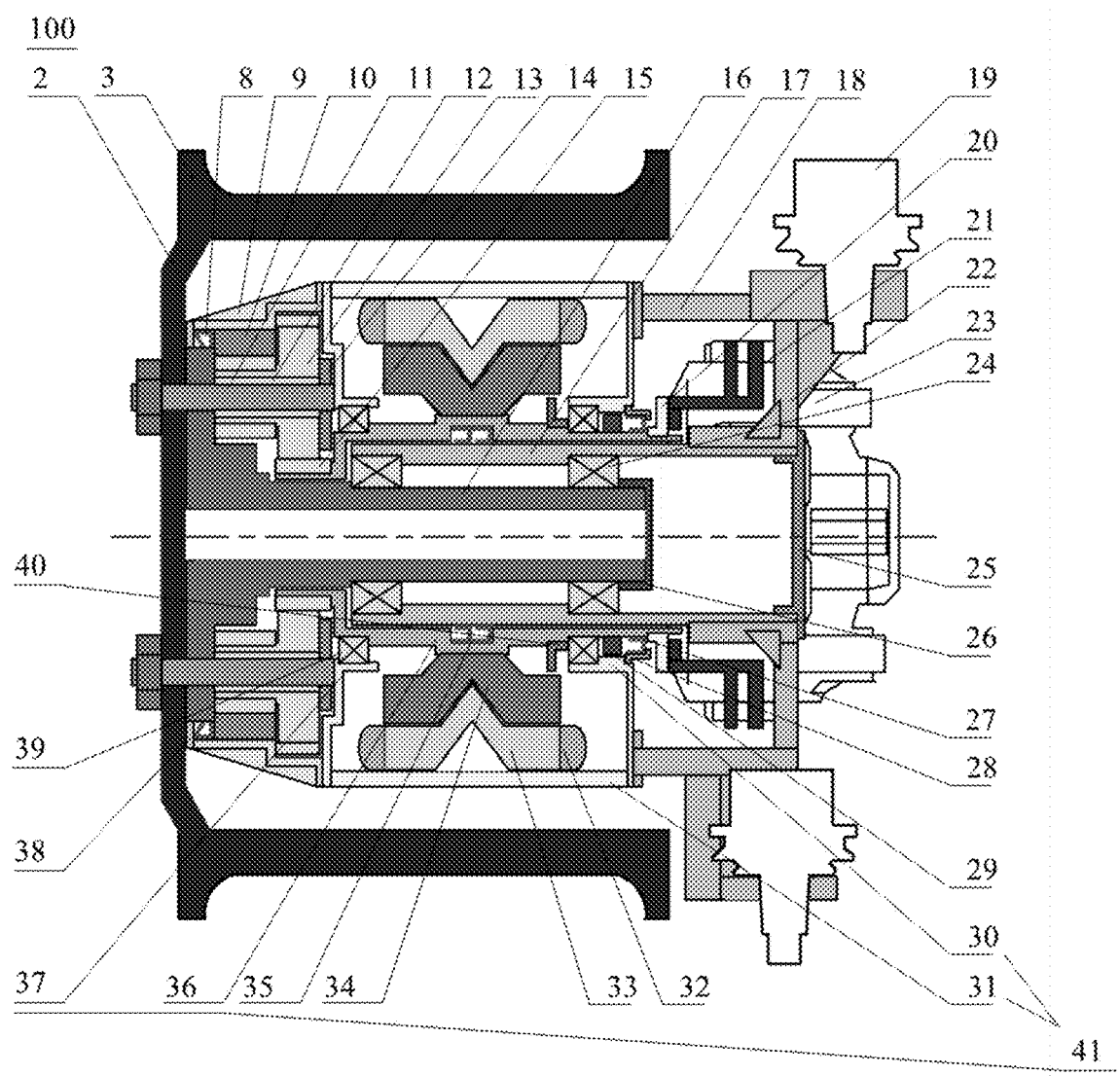
FIG. 3 is a schematic view of a section of an electric wheel assembly with an integrated hub motor according to an embodiment of the present disclosure.

As illustrated in FIGS. 1 to 3, the electric wheel assembly 100 according to embodiments of the present disclosure includes a tire 1, a rim 3, a hub 16, a planetary reducer 4, an inner rotor motor 5, a braking system 6 and a steering knuckle assembly 7. The rim 3 is adapted to mount the tire 1, an axial end of the rim 3 has a spoke plate 2, and the hub 16 is connected to the spoke plate 2. The steering knuckle assembly 7 includes a knuckle sleeve 17. The knuckle sleeve 17 is fitted over a shaft segment of the hub 16, and hub bearings 24 are provided between the knuckle sleeve 17 and the hub 16. The inner rotor motor 5 is provided in the rim 3. The inner rotor motor 5 includes a motor housing 41, a rotor 34 and a stator 33. The motor housing 41 includes a motor rotor holder 36 fitted over an outside of the knuckle sleeve 17 and a motor stator housing 31 located at the radially outermost periphery of the inner rotor motor 5. The rotor 34 is fitted over and secured on the motor rotor holder 36, the stator 33 is fitted in and secured on the motor stator housing 31, and the stator 33 is fitted over an outside of the rotor 34. The rotor 34 has a hollow structure such that the knuckle sleeve 17 and the shaft segment of the hub 16 can be arranged. The planetary reducer 4 includes a sun gear 15 and a planet carrier integrated with the hub 16. The sun gear 15 is connected to an end of the motor rotor holder 36 close to the spoke plate 2 and serves as an input end of the planetary reducer 4, and the planet carrier serves as an output end of the planetary reducer 4. The braking system 6 includes a brake disc 21. The brake disc 21 is fitted over the motor rotor holder 36 through a brake disc connection sleeve 20 and located at an end of the rotor 34 sleeve away from the spoke plate 2. The braking system 6 brakes the electric wheel assembly 100 by braking the motor rotor holder 36.

It could be understood that, the inner rotor motor 5 has a hollow structure, the knuckle sleeve 17 of the steering knuckle assembly 7 passes through the hollow motor rotor holder 36, a motor bearing 39 is provided between the motor rotor holder 36 and a fixed portion of the motor housing 41, hub bearings 24 is provided between the knuckle sleeve 17 and the hub 16, and motor bearings 39 is provided at a radially outside of the hub bearing 24. Thus, the radial space in the wheel is fully used. On the one hand, a force-bearing center of the electric wheel assembly 100 is closer to a wheel center of the tire 1 to ensure enough span of two hub bearings 24, This makes the force-bearing of the electric wheel assembly 100 more reasonable, and improves the reliability and safety of the electric wheel assembly 100. On the other hand, the radial space in the wheel is fully used to facilitate reduction in the axial size of the electric wheel assembly 100, thereby reducing the overall size of the electric wheel assembly 100. It should be noted that, the braking system 6 brakes the electric wheel assembly 100 by braking the brake disc connection sleeve 20, the rotor holder 36 and the planetary reducer 4, compared to a conventional solutions of braking the rim 3, the braking system 6 according to embodiments of the present disclosure, which is disposed at a high speed end of the electric wheel, can reduce the demanded brake force of the braking system 6, therefore, the braking system 6 can be designed to be lighter, greatly reducing the mass of the electric wheel assembly 100.

In some embodiments, the inner rotor motor 5 is a radial field motor, or a radial-axial hybrid-field motor. In the embodiment of the hybrid field motor, longitudinal sections of the rotor 34 and the stator 33 are both formed as saddle shapes. It could be understood that, the saddle-shaped section makes the magnetic field of the motor have both axial and radial components, and the advantages of this arrangement are that the torque density and the power density of the motor can be effectively improved.

In some embodiments, as illustrated in FIG. 3, the motor housing 41 further includes a motor inner end cap 30 and a motor outer end cap 37. The motor inner end cap 30 is connected to a side of the motor stator housing 31 away from the spoke plate 2, and the motor inner end cap 30 is connected to the steering knuckle assembly 7. The motor outer end cap 37 is connected to a side of the motor stator housing 31 close to the spoke plate 2. The motor outer end cap 37 and the motor rotor holder 36 are provided with a motor bearing 39 therebetween, and the motor inner end cap 30 and the motor rotor holder 36 are provided with a motor bearing 39 therebetween. It could be understood that the motor housing 41 has functions of bearing, fixing, and protecting the inner rotor motor 5. The motor stator housing 31 may also be arranged with a cooling channel. The motor rotor holder 36 transfers an output torque of the motor. The motor outer end cap 37 and the motor inner end cap 30 may be arranged with a bearing positioning face, to limit axial displacement of the motor bearings 39. In some optional embodiments, the motor bearings 39 are deep groove ball bearings, and the hub bearings 24 are tapered roller bearings. Certainly, the types of the motor bearing 39 and the hub bearing 24 are not limited to the above two types, and the types of the motor bearing 39 and the hub bearing 24 can be changed according to specific conditions in practice.

In some embodiments, the motor rotor holder 36 and the motor inner end cap 30 are provided with a motor oil seal 27 therebetween, the motor oil seal 27 is located at a side of the motor bearing 39 away from the spoke plate 2, and a motor oil seal retaining ring 28 may also be provided among a side of the motor oil seal 27 away from the spoke plate 2, the motor inner end cap 31 and the motor rotor holder 36. An oil seal groove is provided between the motor rotor holder 36 or the knuckle sleeve 17, e.g. in an inner peripheral wall of the motor rotor holder 36 or in an outer peripheral wall of the knuckle sleeve 17. The oil seal groove is provided with a knuckle oil seal 35 therein, and the knuckle oil seal 35 is fitted over the knuckle sleeve 17. Thus, the lubrication oil can be prevented from leakage from a direction of the motor inner end cap 30. In some embodiments, the knuckle oil seal 35 may be a split oil seal.

In some embodiments, a resolver 29 is arranged between the motor bearing 39 away from the spoke plate 2 and the motor oil seal 27. It should be noted that, axial positions of the resolver 29 and the motor oil seal 27 may be exchanged according to practical conditions. That is, the motor oil seal 27 is arranged between the resolver 29 and the motor bearing 39 away from the spoke plate 2.

In some embodiments, the sun gear 15 is mounted to an end of the motor rotor holder 36 close to the spoke plate 2, and an end of the motor rotor holder 36 away from the spoke plate 2 is connected to the brake disc 21 of the braking system 6 through the brake disc connection sleeve 20.

It should be noted that, the end of the motor rotor holder 36 close to the spoke plate 2 is provided with an external spine, the sun gear 15 is hollow and provided with an internal spine, and the two are connected by the spine and axially positioned by a lip, an elastic retaining ring or the like. Certainly, connection manner of the motor rotor holder 36 and the sun gear 15 is not limited to the above one. The sun gear 15 may also be axially secured to the motor rotor holder 36 by bolts, or a combination of bolts and pins, or mounted to the motor rotor holder 36 by way of interference fit. The sun gear 15 and the motor rotor holder 36 may also be integrally processed into one piece.

It could be understood that, when the inner rotor motor 5 starts to operate, the motor rotor holder 36 rotates, the torque can be output to the planetary reducer 4 through the sun gear 15, and the planetary reducer 4 can drive the rim 3. Since the inner rotor motor 5 and the rim 3 are provided with the planetary reducer 4 therebetween, higher torque demand can be satisfied by the electric wheel assembly 100.

Figure 4:
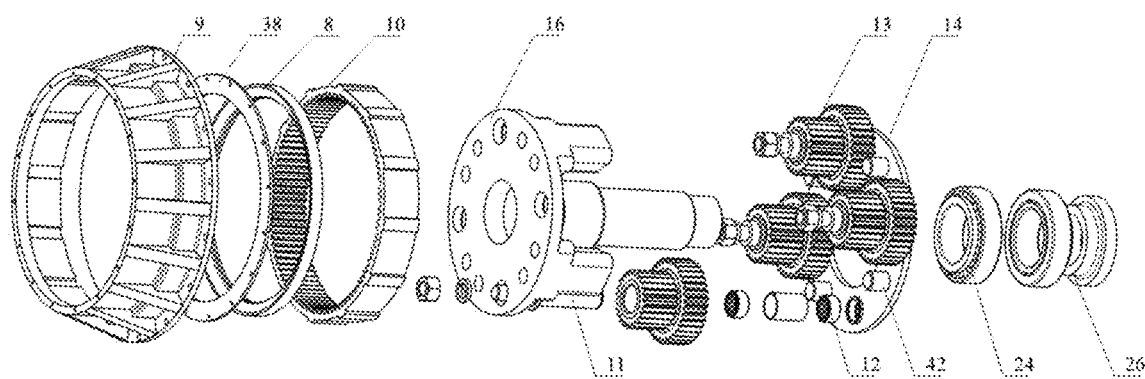
FIG. 4 is an exploded schematic view of a planetary reducer according to an embodiment of the present disclosure.

In some specific embodiments, as illustrated in FIGS. 3 and 4, the planetary reducer 4 is a one-stage planetary reducer. The planetary reducer 4 further includes an auxiliary planet carrier 14, planet gears 13, a planet gear pin 11, a gear ring 10 and a gear ring carrier 9. The planet carrier of the planetary reducer 4 and the hub are integrated into one piece, and the auxiliary planet carrier 14 is mounted to an end of planet carrier away from spoke plate 2. A plurality of planet gears 13 is provided, each planet gear 13 is mounted between the planet carrier and the auxiliary planet carrier 14 through the planet gear pin 11, and each planet gear 13 meshes with the sun gear 15 to transfer power from the inner rotor motor 5. The gear ring 10 is fitted over the planet gears 13 and meshes with the planet gears 13, and the gear ring carrier 9 is fitted over the gear ring 10. An end of the gear ring carrier 9 away from the spoke plate 2 is connected to the motor stator housing 31 and the motor outer end cap 37, the gear ring carrier 9 is formed as a stepped sleeve gradually expanded in a direction away from the spoke plate 2, and a peripheral face of the gear ring carrier 9 is provided with a reinforcing rib.

In some specific embodiments, each planet gear 13 employs a gear structure including: a primary gear meshing with the sun gear 15; and a secondary gear disposed coaxially with the primary gear and meshing with the gear ring 10. The number of teeth on the secondary gear is less than the number of teeth on the primary gear. This structure of two-stage planet gear is employed so that the transmission ratio from the sun gear 15 to the planet carrier integrated with the hub 16 can be effectively increased. The transmission ratio can be expressed as follows.

$$i_{1H} = \left(\frac{z_2}{z_1} + 1\right)\left(\frac{z_2}{z_2} + 1\right)$$

The number of teeth on the sun gear 15 is denoted as $z_1$, the number of teeth on primary planet gear 13 is denoted as $z_2$, the number of teeth on the secondary gear is denoted as $z_3$, and the number of teeth on the gear ring 10 is denoted as $z_4$. In summary, the primary stage employs a form of two-stage gear, such that an effect similar to a two-stage planetary reducer can be obtained while ensuring an adequate transmission ratio. The axial length of the planetary reducer 4 can also be effectively reduced, to make the position of the hub bearing 24 wholly closer to the wheel center and make the support span greater. The planetary reducer 4 designed in this way also has a lighter mass. It needs to be added that, the primary gear and the secondary gear may be manufactured integrally, and may also be manufactured separately and then connected on the same axis by interference or other connection ways.

Specifically, the hub 16 integrated with the planet carrier is not only the hub 16 of the electric wheel assembly 100, but also the planet carrier of the planetary reducer 4. The planet carrier is connected to the spoke plate 2. The planet carrier is provided with through holes fitted with the planet gear pins 11, an end of the planet gear pin 11 passes through the planet carrier, the plate 2 and is locked on the spoke plate 2 through a nut and connection keys, and the other end of the planet gear pin 11 passes through the auxiliary planet carrier 14 and is positioned on the auxiliary planet carrier 14 through a shaft retaining ring. The planet gear pin 11 is provided with a lubrication oil channel. It could be understood that, the auxiliary planet carrier 14, the planet carrier and the spoke plate 2 are connected by the planet gear pin 11, and the planet gear pin 11 is provided the lubrication oil channels. Thus a stable connection between the hub 16 integrated with the planet carrier and the planetary reducer 4 is ensured, and the lubrication effect of the planetary reducer 4 is guaranteed. Advantageously, the pin hole in the spoke plate 2 for mounting the planet gear pin 11 is provided with key slots. Thus, movement of the planet gear pin 11 can be further constrained, and the rotation of the planet gear pin 11 can be constrained during screwing the nut, which is convenient for facilitating the assembly.

Figure 5:
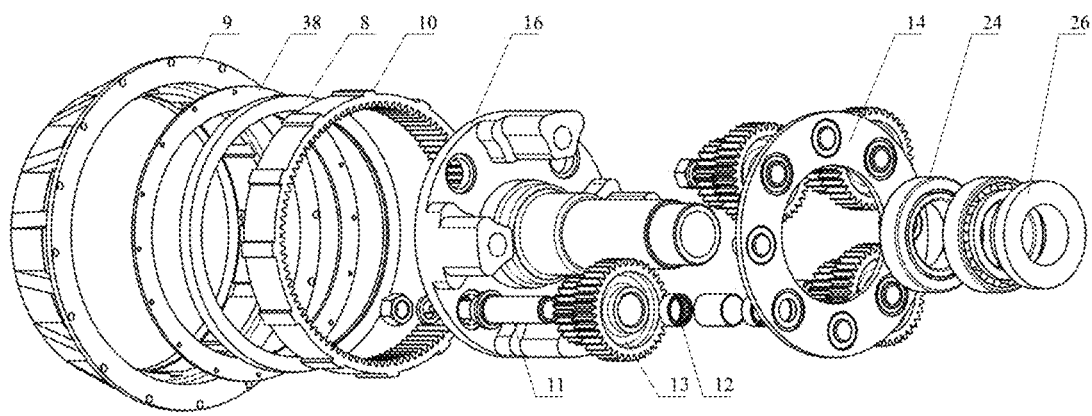
FIG. 5 is another exploded schematic view of a planetary reducer according to an embodiment of the present disclosure.
Figure 6:
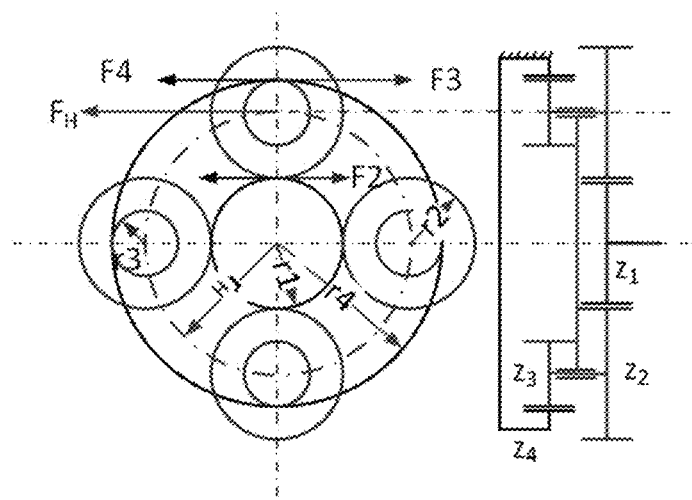
FIG. 6 is a schematic diagram illustrating an operational principle of a planetary reducer according to an embodiment of the present disclosure.
Figure 7:
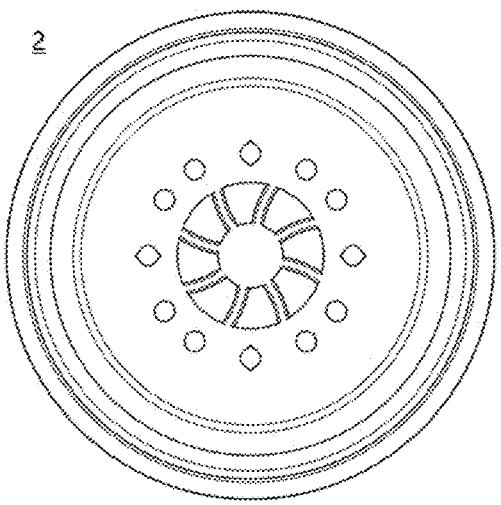
FIG. 7 is a schematic view of a spoke plate according to an embodiment of the present disclosure.

Specifically, the planetary reducer 4 further includes a toque transferring pin 42, an end of the toque transferring pin 42 passes through the auxiliary planet carrier 14 and is positioned on the auxiliary planet carrier 14 through a shaft retaining ring, and the other end of the toque transferring pin 42 is connected to the planet carrier. With reference to FIGS. 4 and 5, there are several protruding structures in the space between the planet gears 13 placed on the planet carrier. The number of the protruding structures is the same as the number of the planet gears 13, and the protruding structure has a hole that allows the toque transferring pin 42 to pass through. Thus, connection between the auxiliary planet carrier 14 and the planet carrier is further enhanced, the stiffness and strength of the planet carrier is promoted, and the reliability of the planetary reducer 4 is improved.

Specifically, the planetary reducer 4 further includes a gear ring end cap 38. The gear ring end cap 38 is mounted to an end of the gear ring carrier 9 close to the spoke plate 2, the gear ring end cap 38 is fitted over an outside of the planet carrier. The gear ring end cap 38, the gear ring 10, the gear ring carrier 9 and the planet carrier defines a gap thereamong. The gap is provided with a reducer oil seal 8 therein, and the reducer oil seal 8 is locked by the gear ring end cap 38 fixed on the gear ring carrier through a screw. Thus, the sealing effect on the lubrication oil in the planetary reducer 4 is ensured, to avoid the leakage of the lubrication oil. The gear ring 10 and the gear ring carrier 9 can be connected by an interference fit.

In some embodiments, the motor inner end cap 30 is provided with a lubrication oil inlet, the motor outer end cap 37 is provided with a lubrication oil outlet, and the lubrication oil outlet is open to the interior of the planetary reducer 4. It should be noted that, the electric wheel assembly 100 employs an integrated cooling method in this way, where the inner rotor motor 5 is directly cooled by oil and shares common oil paths with the planetary reducer 4. The motor cooling/lubrication oil of high insulation (short for lubrication oil in the following) serves as the lubrication oil for the planetary reducer 4 at the same time to lubricate and cool the planetary reducer 4. An oil pump, an oil radiator and a filter are provided on the chassis, so that the lubrication oil after cooled and filtered is pumped into the inner rotor motor 5 via the lubrication oil inlet in the motor inner end cap 30, passes through the stator 33 and the winding 32, and flows into a cavity of the planetary reducer 4 via the lubrication oil outlet in the motor outer end cap 37 to lubricate and cool it. The lubrication oil flows from the sun gear 15 to the hub bearing 24, and enters an internal space of the steering knuckle assembly 7. The lubrication oil flows to the filter and the radiator through an oil return opening in the steering knuckle assembly 7.

In summary, the integrated cooling and lubricating method is employed, such that the overall structure of the electric wheel assembly 100 is more compact. The inner rotor motor 5 is directly cooled by the oil, and a water jacket of the inner rotor motor 5 can be omitted, to reduce radial size of the inner rotor motor 5. The stator 33 and the winding 32 of the inner rotor motor 5 are wholly cooled, the cooling effect on the inner rotor motor 5 can be improved, the lubrication state and the reliability of the planetary reducer 4 can be promoted, and the planetary reducer 4 can also be cooled.

Certainly, in other embodiments of the present disclosure, when the lubrication oil cannot satisfy the required insulation grade, or there is no filter to filter the abrasive dust generated by the planetary reducer 4, the inner rotor motor 5 and the planetary reducer 4 need to be lubricated and cooled separately. In this case, no lubrication oil outlet is provided in the motor outer end cap 37 of the inner rotor motor 5, and an oil seal and an oil slinger 40 are provided between the motor outer end cap 37 and the housing of the reducer to prevent the motor lubrication oil from entering the planetary reducer 4.

In some embodiments, as illustrated in FIG. 3, an end of the hub 16 away from the spoke plate 2 is mounted with a round nut 26, and an end of the round nut 26 abuts against an end face of the hub bearing 24 away from the spoke plate 2. It could be understood that, the round nut 26 can avoid occurrence of axial displacement of the hub bearing 24.

In some embodiments, the steering knuckle assembly 7 further includes a knuckle 22, a steering knuckle housing 18 and a sealing end cap 25. The knuckle 22 is mounted to an end of the knuckle sleeve 17 away from the spoke plate 2, and the knuckle 22 may be provided with a mounting opening for a suspension control arm, a knuckle arm, or a steering tie rod. The end of the steering knuckle housing 18 away from the spoke plate 2 is connected to the knuckle 22, and the other end thereof close to the spoke plate 2 is provided with a flange for supporting the motor housing 41. The sealing end cap 25 is snapped into a side of the knuckle 22 away from the spoke plate 2, and the sealing end cap 25 is provided with an oil return hole for backflow of the lubrication oil. A side of the knuckle 22 has a mounting hole for a brake caliper 23, a motor mounting flange of the other side thereof also has an aperture to arrange a coolant inlet, and interface of the high-voltage motor cables, and an interface of the a low-voltage signal (such as a motor resolver 29 signal and a temperature sensor signal)cable. The steering knuckle assembly 7 is used to realize the support for the electric wheel assembly 100, is mounted with structures of a suspension spherical hinge 19 and the steering knuckle arm or the similar structures to connect the suspension and the steering system, and also provides a mounting plane for the inner rotor motor 5. The sealing end cap 25 can avoid leakage of the lubrication oil in the knuckle sleeve 17. Certainly, the steering knuckle assembly 7 is not limited to a manufacturing method of separate processing, and can employ a manufacturing method of integrated processing, in which the knuckle 22, the knuckle sleeve 17 and the steering knuckle housing 18 are integrally processed into one piece.

In some specific embodiments, the braking system 6 further includes a brake caliper 23, and the brake caliper 23 is connected to the steering knuckle housing 18 of the steering knuckle assembly 7. It could be understood that, the mounting way of the brake disc 21 being directly mounted to the motor rotor holder 36 (through the brake disc connection sleeve 20) reduces the required brake torque by the braking system 6, and thus helps to reduce the size of the brake caliper 23, thereby reducing the mass of the braking system 6.

Advantageously, the brake disc connection sleeve 20 is made of ceramic material of good thermal insulation effect, thereby effectively reducing influence of the heat from the brake disc 21 on the inner rotor motor 5 and guaranteeing good operation qualities of the inner rotor motor 5.

Advantageously, two ends of the steering knuckle housing 18 is connected by a structure with holes, and a head wind can be introduced into the brake disc 21 to ensure effective cooling for the brake disc 21 during driving.

Optionally, the braking system 6 may be a disc mechanical braking system regardless of a pneumatic brake or a hydraulic brake.

Advantageously, the electric wheel assembly 100 is able to achieve the electro-pneumatic brake or electro-hydraulic brake, and when the electric wheel assembly is in the regenerative braking mode, the inner rotor motor 5 can provide a braking toque, and operates synergistically with the disc braking system 6 with variable pneumatic or hydraulic pressure.

EMBODIMENT

A specific structure for an electric wheel assembly 100 with an integrated hub 16 motor according to a specific embodiment of the present disclosure will be described in the following with reference to FIGS. 1 to 7.

The electric wheel assembly 100 with the integrated hub 16 motor of the present embodiment includes a tire 1, a rim 3, a hub 16, a planetary reducer 4, an inner rotor motor 5, a braking system 6 and a steering knuckle assembly 7. The rim 3 is adapted to mount the tire 1, an axial end of the rim 3 has a spoke plate 2, and the hub 16 is connected to the spoke plate 2. The steering knuckle assembly 7 includes a knuckle sleeve 17. The steering knuckle assembly 17 is fitted over a shaft segment of the hub 16, and hub bearings 24 are provided between the knuckle sleeve 17 and the hub 16. The inner rotor motor 5 is provided in the rim 3. The inner rotor motor 5 includes a motor housing 41, a rotor 34 and a stator 33. The motor housing 41 includes a motor rotor holder 36 fitted over the outside of the knuckle sleeve 17 and a motor stator housing 31 located at the radially outermost periphery of the inner rotor motor 5. The rotor 34 is fitted over and secured on the motor rotor holder 36, the stator 33 is fitted in and secured on the motor stator housing 31, and the stator 33 is fitted over the outside of the rotor 34. The rotor 34 has a hollow structure such that the knuckle sleeve 17 and the shaft segment of the hub 16 can be arranged. The planetary reducer 4 includes a sun gear 15 and a planet carrier integrated with the hub 16. The sun gear 15 is connected to an end of the motor rotor holder 36 close to the spoke plate 2 and serves as the input end of the planetary reducer 4, and the planet carrier serves as the output end of the planetary reducer 4. The braking system 6 includes a brake disc 21. The brake disc 21 is fitted over the motor rotor holder 36 through a brake disc connection sleeve 20 and located at the end of the rotor 34 sleeve away from the spoke plate 2. The braking system 6 brakes the electric wheel assembly 100 by braking the motor rotor holder 36. The motor housing 41 further includes a motor inner end cap 30 and a motor outer end cap 37. The motor inner end cap 30 is connected to a side of the motor stator housing 31 away from the spoke plate 2, and the motor inner end cap 30 is connected to the steering knuckle assembly 7. The motor outer end cap 37 is connected to a side of the stator housing 31 close to the spoke plate 2. The motor outer end cap 37 and the motor rotor holder 36 are provided with a motor bearing 39 therebetween, and the motor inner end cap 30 and the motor rotor holder 36 are provided with a motor bearing 39 therebetween. The motor rotor holder 36 and the motor inner end cap 30 are provided with a motor oil seal 27 therebetween, the motor oil seal 27 is located at a side of the motor bearing 39 away from the spoke plate 2, and a motor oil seal retaining ring 28 may also be provided among a side of the motor oil seal 27 away from the spoke plate 2, the motor inner end cap 31 and the motor rotor holder 36. A resolver 29 is arranged between the motor bearing 39 away from the spoke plate 2 and the motor oil seal 27. The sides of the two motor bearings 39 close to the rotor 34 are further provided with an oil slinger 40 fitted over the motor rotor holder 36. An oil seal groove is provided in the motor rotor holder 36 or the knuckle sleeve 17, e.g. in an inner peripheral wall of the motor rotor holder 36 or in an outer peripheral wall of the knuckle sleeve 17. The oil seal groove is provided with a knuckle oil seal 35 therein, and the knuckle oil seal 35 is fitted over the knuckle sleeve 17.

The planetary reducer 4 is a one-stage planetary reducer 4. The planetary reducer 4 further includes a planet gear 13, a planet gear pin 11, an auxiliary planet carrier 14, a gear ring 10 and a gear ring carrier 9. The auxiliary planet carrier 14 is mounted to the end of planet carrier away from spoke plate 2. Four planet gears 13 are provided, each planet gear 13 is mounted between the planet carrier and the auxiliary planet carrier 14 through the planet gear pin 11, and each planet gear 13 meshes with the sun gear 15 to transfer power input from the inner rotor motor 5. The gear ring 10 is fitted over the planet gear 13 and meshes with the planet gear 13, and the gear ring carrier 9 is fitted over the gear ring 10. An end of the gear ring carrier 9 away from the spoke plate 2 is connected to the motor stator housing 31 and the motor outer end cap 37, the gear ring carrier 9 is formed as a stepped sleeve gradually expanded in a direction away from the spoke plate 2, and a peripheral face of the gear ring carrier 9 is provided with a reinforcing rib.

Each planet gear 13 employs a gear structure including: a primary gear meshing with the sun gear 15; and a secondary gear disposed coaxially with the primary gear and meshing with the gear ring 10. The number of teeth on the secondary gear is less than the number of teeth on the primary gear. The hub 16 integrated with the planet carrier is not only the hub 16 of the electric wheel assembly 100, but also the planet carrier of the planetary reducer 4. The planet carrier is connected to the spoke plate 2. The planet carrier is provided with through holes fitted with the planet gear pins 11, an end of the planet gear pin 11 passes through the planet carrier, the spoke plate 2 and is locked on the spoke plate 2 through a nut and connection keys, and the other end of the planet gear pin 11 passes through the auxiliary planet carrier 14 and is positioned on the auxiliary planet carrier 14 through a shaft retaining ring. The planet gear pin 11 defines a lubrication oil channel. The pin hole on the spoke plate 2 for mounting the planet gear pin 11 is provided with a key slot.

The planetary reducer 4 further includes a toque transferring pin 42, the end of the toque transferring pin 42 passes through the auxiliary planet carrier 14 and is positioned on the auxiliary planet carrier 14 through a shaft retaining ring, and the other end of the toque transferring pin 42 is connected to the planet carrier. With reference to FIGS. 4 and 5, there are four protruding structures in the space among the planet gears 13 placed on the planet carrier, the number of the protruding structures is the same as the number of the planet gears 13, and the protruding structure has a hole that allows the toque transferring pin 42 to pass through.

The planetary reducer 4 further includes a gear ring end cap 38. The gear ring end cap 38 is mounted to an end of the gear ring carrier 9 close to the spoke plate 2, the gear ring end cap 38 is fitted over an outside of the planet carrier, the gear ring end cap 38, the gear ring 10, the gear ring carrier 9 and the planet carrier defines a gap thereamong, the gap is provided with a reducer oil seal 8 therein, and the reducer oil seal 8 is locked by the gear ring end cap 38 fixed on the gear ring 10 through screws. An end of the hub 16 away from the spoke plate 2 is mounted with a round nut 26, and an end of the round nut 26 abuts against an end face of the hub bearing 24 away from the spoke plate 2.

The steering knuckle assembly 7 further includes a knuckle 22, a steering knuckle housing 18 and a sealing end cap 25. The knuckle 22 is mounted to the end of the knuckle sleeve 17 away from the spoke plate 2, and the knuckle 22 may be provided with a mounting opening for suspension control arms, the knuckle arm, or the steering tie rod. An end of the steering knuckle housing 18 away from the spoke plate 2 is connected to the knuckle 22, and the end thereof close to the spoke plate 2 is provided with a flange for the motor housing 41. The sealing end cap 25 is snapped into a side of the knuckle 22 away from the spoke plate 2, and the sealing end cap 25 is provided with an oil return hole for backflow of the lubrication oil. A side of the knuckle 22 has a mounting hole for a brake caliper 23, a motor mounting flange face of the other side thereof also has an aperture to arrange a coolant inlet, an interface of the high-voltage cables, and the interface of the a low-voltage signal (such as a motor resolver 29 signal and a temperature sensor signal) cable. Two ends of the steering knuckle housing 18 are connected by a structure with holes. The braking system 6 further includes a brake caliper 23, and the brake caliper 23 is connected to the steering knuckle housing 18 of the steering knuckle assembly 7.

The electric wheel assembly 100 with the integrated hub 16 motor of the present embodiment provides an electric wheel configuration which is retarded and driven by the hub 16 motor and which has high power and torque density, high level of lightweight, and reasonable loading for various components, thereby minimizing the overall mass while balancing dynamic property, efficiency, sealing and heat dissipation.

The electric wheel assembly 100 with the integrated hub 16 motor of the present embodiment has the following advantages.

(1) The rotor 34 of the inner rotor motor 5 is hollow, the rotor 34 is fitted over the motor rotor holder 36, and the knuckle sleeve 17 and the shaft segment of the hub 16 integrated with the planet carrier can directly pass through the hollow structure of the motor, such that the structure is more compact, and the arranged position and span of the hub bearings 24 of the wheel become more reasonable.

(2) The braking system 6 is arranged at the side of the inner rotor motor 5 away from the spoke plate 2, the inner rotor motor 5 and the planetary reducer 4 are arranged adjacent to each other in the axial direction, and the inner rotor motor 5 and the planetary reducer 4 can employ a cooling and lubricating method of integrated direct oil cooling. For the inner rotor motor 5, the stator 33 and the winding 32 are wholly cooled directly, which has a good cooling effect, and a cooling water jacket of the inner rotor motor 5 can be removed or replaced by a thinner cooling oil jacket, to reduce the radial size of the inner rotor motor 5 and improve the torque and power density of the inner rotor motor 5. For the planetary reducer 4, this method can improve the lubrication state and the reliability of the planetary reducer 4. The integration level of the overall electric wheel assembly 100 can be promoted. In the case where it is impossible to perform the integrated cooling and lubricating method, an alternative solution of separate cooling and lubricating method can be realized without great modification.

(3) The planetary reducer 4 employs the planet gears 13 having the structure which is able to effectively improve the transmission ratio while ensuring the reliability, and has a shorter axial size compared to a two-stage or multi-stage reducer. The arrangement of the inner rotor motor 5 is facilitated, the arranged position and the support span of the hub bearing 24 can be better, and the volume and the mass can be smaller, helping to reduce the sprung mass.

(4) The planet carrier of the planetary reducer 4 serves as the hub 16 at the same time, and is able to connect the spoke plate 2 and to arrange the hub bearing 24 supporting the wheel, while supporting the planet gears 13 together with the auxiliary planet carrier 14.

(5) The braking system 6 is arranged in the wheel. The brake disc is directly mounted to the motor rotor holder 36 through the brake disc connection sleeve 20 made of thermal insulation material. The braking friction torque is transferred to the wheel after being increased by the planetary reducer 4. This arrangement makes the brake disc 21 have a smaller diameter, effectively promotes the lightweight level, greatly saves the space in the wheel, and facilitates the arrangement of the suspension system and the steering tie rods or the like beside the wheel. The structure on the steering knuckle housing 18 of the steering knuckle assembly 7 with holes can facilitate the import of the head wind to cool the braking system 6.

Reference throughout this specification to "an embodiment," "some embodiments," "an illustrative embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

What is claimed is:

1. An electric wheel assembly with an integrated hub motor, comprising:
   a rim adapted to mount a tire and having a spoke plate at an axial end of the rim;
   a hub connected to the spoke plate;
   a steering knuckle assembly comprising a knuckle sleeve, the knuckle sleeve being fitted over a shaft section of the hub, the knuckle sleeve and the hub being provided with a hub bearing therebetween;
   an inner rotor motor provided inside the rim and comprising:
      a motor housing comprising a motor rotor holder fitted over an outside of the knuckle sleeve,
      a rotor having a hollow structure, fitted over and secured on the motor rotor holder, and a stator fitted in and secured on the motor housing, the stator being fitted over an outside of the rotor;
a planetary reducer comprising:
a sun gear connected to an end of the motor rotor holder close to the spoke plate and being an input end of the planetary reducer, and
a planet carrier integrated with the hub and being an output end of the planetary reducer; and
a braking system comprising a brake disc, the brake disc being fitted over the motor rotor holder through a brake disc connection sleeve and located at an end of the motor rotor holder away from the spoke plate, and the braking system being configured to brake the electric wheel assembly by braking the motor rotor holder.

2. The electric wheel assembly according to claim 1, wherein the inner rotor motor is a radial field motor, or a radial-axial hybrid-field motor.

3. The electric wheel assembly according to claim 2, wherein the braking system is a disc mechanical braking system regardless of a pneumatic brake or a hydraulic brake, the electric wheel assembly is able to achieve the electro-pneumatic or electro-hydraulic hybrid brake, and when the electric wheel assembly is in the regenerative braking mode, the inner rotor motor is able to provide a braking toque, and operate synergistically with the disc braking system with variable pneumatic pressure or variable hydraulic pressure.

4. The electric wheel assembly according to claim 1, wherein the motor housing further comprises:
a motor stator housing fitted over the stator;
a motor inner end cap connected to a side of the motor stator housing away from the spoke plate and connected to the steering knuckle assembly; and
a motor outer end cap connected to a side of the motor stator housing close to the spoke plate,
wherein the motor outer end cap and the motor rotor holder are provided with a motor bearing therebetween, and the motor inner end cap and the motor rotor holder are provided with a motor bearing therebetween.

5. The electric wheel assembly according to claim 4, wherein the planetary reducer is a one-stage planetary reducer, and the planetary reducer further comprises:
an auxiliary planet carrier mounted to an end of the planet carrier away from the spoke plate;
a plurality of planet gears, each planet gear being mounted between the planet carrier and the auxiliary planet carrier through a planet gear pin and meshing with the sun gear to transmit power output by the inner rotor motor;
a gear ring fitted over the planet gears and meshing with the planet gears; and
a gear ring carrier fitted over the gear ring, an end of the gear ring carrier being connected to the motor stator housing and the motor outer end cap, the gear ring carrier being formed as a stepped sleeve gradually expanded in a direction away from the spoke plate, and a peripheral face of the gear ring carrier being provided with a reinforcing rib.

6. The electric wheel assembly according to claim 5, wherein each planet gear employs a gear structure comprising:
a primary gear meshing with the sun gear; and
a secondary gear disposed coaxially with the primary gear and meshing with the gear ring, the number of teeth on the secondary gear being less than the number of teeth on the primary gear.

7. The electric wheel assembly according to claim 5, wherein the planet carrier is provided with through holes fitted with the planet gear pins, an end of the planet gear pin passes through the planet carrier and the spoke plate, and is locked on the spoke plate though a nut and connection keys; the other end of the planet gear pin passes through the auxiliary planet carrier and is positioned on the auxiliary planet carrier through a shaft retaining ring, and the planet gear pin is provided with a lubrication oil channel.

8. The electric wheel assembly according to claim 7, wherein the planetary reducer further comprises a toque transferring pin, an end of the toque transferring pin passes through the auxiliary planet carrier and is positioned on the auxiliary planet carrier through a shaft retaining ring, and the other end of the toque transferring pin is connected to the planet carrier.

9. The electric wheel assembly according to claim 7, wherein the planetary reducer further comprises a gear ring end cap connected to an end of the gear ring carrier close to the spoke plate, the gear ring end cap is fitted over an outside of the planet carrier; the gear ring end cap, the gear ring, the gear ring carrier, and the planet carrier defines a gap thereamong; the gap is provided with a reducer oil seal therein, and the reducer oil seal is locked by the gear ring end cap fixed on the gear ring carrier through a screw.

10. The electric wheel assembly according to claim 5, wherein the braking system is a disc mechanical braking system regardless of a pneumatic brake or a hydraulic brake, the electric wheel assembly is able to achieve the electro-pneumatic or electro-hydraulic hybrid brake, and when the electric wheel assembly is in the regenerative braking mode, the inner rotor motor is able to provide a braking toque, and operate synergistically with the disc braking system with variable pneumatic pressure or variable hydraulic pressure.

11. The electric wheel assembly according to claim 4, wherein the motor inner end cap is provided with a lubrication oil inlet, the motor outer end cap is provided with a lubrication oil outlet, and the lubrication oil outlet is open to an interior of the planetary reducer.

12. The electric wheel assembly according to claim 4, wherein the motor rotor holder and the motor inner end cap are provided with a motor oil seal therebetween, the motor oil seal is located at a side of the motor bearing away from the spoke plate, an inner peripheral wall of the motor rotor holder or an outer peripheral wall of the knuckle sleeve is provided with an oil seal groove, the oil seal groove is provided with a knuckle oil seal therein, and the knuckle oil seal is fitted over the knuckle sleeve.

13. The electric wheel assembly according to claim 4, wherein the braking system is a disc mechanical braking system regardless of a pneumatic brake or a hydraulic brake, the electric wheel assembly is able to achieve the electro-pneumatic or electro-hydraulic hybrid brake, and when the electric wheel assembly is in the regenerative braking mode, the inner rotor motor is able to provide a braking toque, and operate synergistically with the disc braking system with variable pneumatic pressure or variable hydraulic pressure.

14. The electric wheel assembly according to claim 1, wherein the sun gear is mounted to the end of the motor rotor holder close to the spoke plate, and the end of the motor rotor holder away from the spoke plate is connected to the brake disc of the braking system through the brake disc connection sleeve.

15. The electric wheel assembly according to claim 14, wherein the braking system is a disc mechanical braking system regardless of a pneumatic brake or a hydraulic brake, the electric wheel assembly is able to achieve the electro-pneumatic or electro-hydraulic hybrid brake, and when the electric wheel assembly is in the regenerative braking mode, the inner rotor motor is able to provide a braking toque, and operate synergistically with the disc braking system with variable pneumatic pressure or variable hydraulic pressure.

16. The electric wheel assembly according to claim 1, wherein an end of the hub away from the spoke plate is mounted with a round nut, and an end of the round nut abuts against an end face of the hub bearing away from the spoke plate.

17. The electric wheel assembly according to claim 1, wherein the steering knuckle assembly further comprises:
- a knuckle mounted to an end of the knuckle sleeve away from the spoke plate, the knuckle being provided with a mounting opening for a suspension swing arm, a steering knuckle arm or a steering tie rod;
- a steering knuckle housing, an end of the steering knuckle housing away from the spoke plate being connected to the knuckle, and the other end thereof is provided with a flange for supporting the motor housing; and
- a sealing end cap snapped into a side of the knuckle sleeve away from the spoke plate and provided with an oil return hole for backflow of the lubrication oil.

18. The electric wheel assembly according to claim 17, wherein the braking system further comprises:
- a brake caliper connected to the steering knuckle housing of the steering knuckle assembly.

19. The electric wheel assembly according to claim 18, wherein the braking system is a disc mechanical braking system regardless of a pneumatic brake or a hydraulic brake, the electric wheel assembly is able to achieve the electro-pneumatic or electro-hydraulic hybrid brake, and when the electric wheel assembly is in the regenerative braking mode, the inner rotor motor is able to provide a braking toque, and operate synergistically with the disc braking system with variable pneumatic pressure or variable hydraulic pressure.

20. The electric wheel assembly according to claim 1, wherein the braking system is a disc mechanical braking system regardless of a pneumatic brake or a hydraulic brake, the electric wheel assembly is able to achieve the electro-pneumatic or electro-hydraulic hybrid brake, and when the electric wheel assembly is in the regenerative braking mode, the inner rotor motor is able to provide a braking toque, and operate synergistically with the disc braking system with variable pneumatic pressure or variable hydraulic pressure.

\* \* \* \* \*